United States Patent
Hempelmann et al.

(10) Patent No.: US 6,676,821 B1
(45) Date of Patent: Jan. 13, 2004

(54) ELECTROCHEMICAL PRODUCTION OF AMORPHOUS OR CRYSTALLINE METAL OXIDES WITH PARTICLES SIZES IN THE NANOMETER RANGE

(75) Inventors: Rolf Hempelmann, St. Ingbert (DE); Harald Natter, Saarbruecken (DE)

(73) Assignee: Henkel Kommanditgesellschaft Auf, Duesseldorf (DE)

( * ) Notice: Subject to any disclaimer, the term of this patent is extended or adjusted under 35 U.S.C. 154(b) by 0 days.

(21) Appl. No.: 09/786,605
(22) PCT Filed: Aug. 28, 1999
(86) PCT No.: PCT/EP99/06368
§ 371 (c)(1), (2), (4) Date: Dec. 4, 2001
(87) PCT Pub. No.: WO00/14302
PCT Pub. Date: Mar. 16, 2000

(30) Foreign Application Priority Data

Sep. 7, 1998 (DE) .......................... 198 40 842

(51) Int. Cl.$^7$ .................................... C25B 1/00
(52) U.S. Cl. ............................ 205/74; 205/538
(58) Field of Search .................. 205/74, 538

(56) References Cited

U.S. PATENT DOCUMENTS

| | | | |
|---|---|---|---|
| 4,067,788 A | 1/1978 | Solomon | 204/96 |
| 4,233,351 A | 11/1980 | Okumura et al. | 428/116 |
| 4,676,877 A * | 6/1987 | Castillo et al. | 205/74 |
| 4,882,014 A | 11/1989 | Coyle et al. | 204/1.5 |
| 5,462,647 A * | 10/1995 | Bhattacharya et al. | 205/74 |
| 5,620,584 A | 4/1997 | Reetz et al. | 205/334 |
| 5,925,463 A | 7/1999 | Reetz et al. | 428/402 |

FOREIGN PATENT DOCUMENTS

| DE | 44 08 512 | 9/1995 |
|---|---|---|
| DE | 44 43 392 | 6/1996 |

OTHER PUBLICATIONS

Zotti et al. article entitled, "Electrodeposition of Amorphous Fe2O3 Films by Reduction of Iron Perchlorate in Acetonitrile" Feb. 1998 J. Electrochem. Soc., vol. 145, No. 2 pp. 385–389.*

J. Electrochem Soc., vol. 145, No. 2, Feb. 1998.
Chemical Abstracts Report 110:65662.
Chemical Abstracts Report 114:31881.

* cited by examiner

Primary Examiner—Arun Phasge
(74) Attorney, Agent, or Firm—Woodcock Washburn LLP

(57) ABSTRACT

Amorphous and/or crystalline oxides of metals of the third to fifth main group or subgroups of the periodic table are obtained in particulate form by an electrochemical process. The process is characterized in that ions of the metal dissolved in an organic electrolyte are electrochemically reduced on a cathode in the presence of an oxidizing agent.

35 Claims, 3 Drawing Sheets

Figure 1:
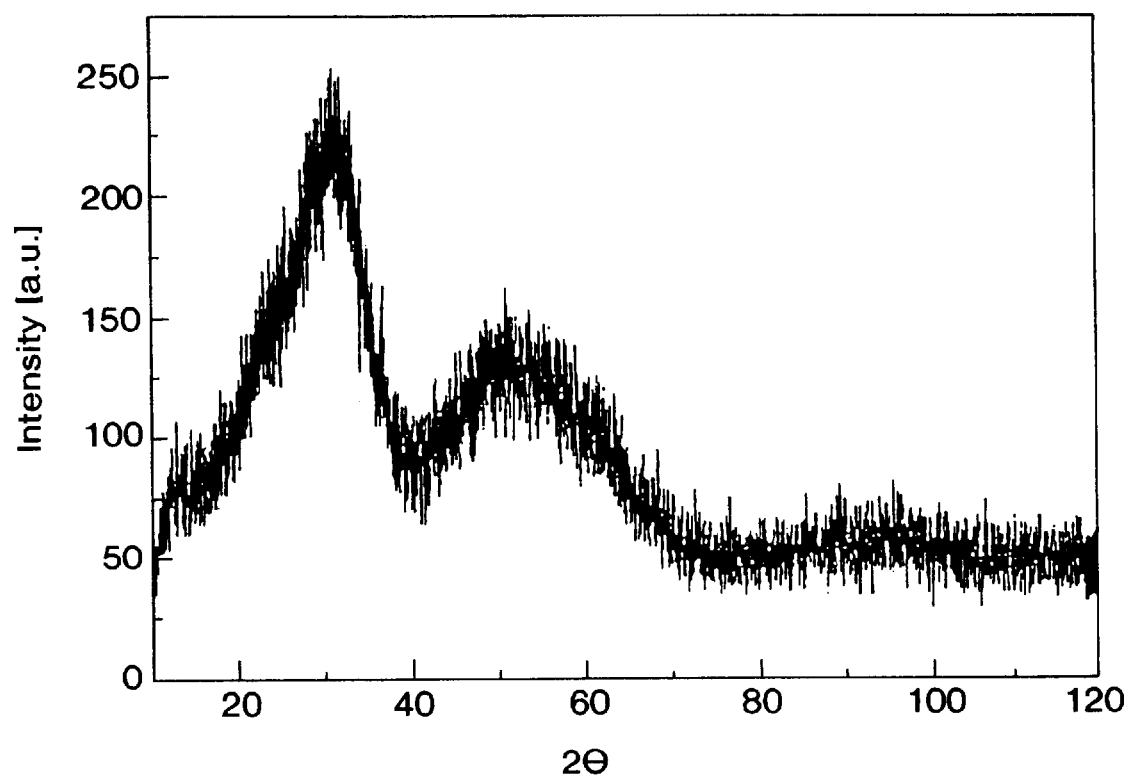

ELECTROCHEMICAL PRODUCTION OF AMORPHOUS OR CRYSTALLINE METAL OXIDES WITH PARTICLES SIZES IN THE NANOMETER RANGE

This application claims priority from German application DE 198 40 842.0, filed Sep. 7, 1998, and International Application PCT/EP99/06368, filed Aug. 28, 1999.

This invention relates to a process for the production of amorphous and/or crystalline oxides of metals of the third to fifth main group or the secondary groups which have mean particle diameters in the nanometer range. In the context of the invention, this is the range from about 1 to about 500 nanometers. More particularly, the amorphous or crystalline metal oxides obtainable by the process according to the invention have particle diameters in the range from about 5 to about 100 nanometers. Metal oxides such as these may be used for various industrial applications: as dielectrics for miniaturized multilayer capacitors, as catalysts, as additives in paints and cosmetics, as additives in plastics to stabilize them against thermal or photochemical decomposition and/or to modify their dielectric and/or magnetic properties and as polishes.

Metal oxides with particle diameters in the nanometer range may be obtained, for example, by dissolving alkoxides of the metals in a water-immiscible solvent, preparing an emulsion of the resulting solution in water using suitable surfactants, the emulsified droplets of the solvent having diameters in the nanometer range, and hydrolyzing the metal alkoxides to the oxides. The disadvantages of this process lie in particular in the fact that the metal alkoxides are expensive starting materials, in the fact that emulsifiers also have to be used and in the fact that the preparation of the emulsion with droplet sizes in the nanometer range is a complicated process step.

It is also known that metal particles (not metal oxide particles!) with a particle size below 30 nm can be produced by cathodically reducing suitable metal salts in organic solvents or mixtures thereof with water in the presence of a stabilizer and optionally in the presence of a supporting electrolyte. Instead of dissolving metal salts in the electrolyte, the metal ions to be cathodically reduced can also be dissolved by using anodes of the corresponding metals which dissolve during the electrolysis. One such process is described in DE-A-44 43 392.

In addition, DE-A44 08 512 describes a process for the electrolytic production of metal colloids in which one or more metals belonging to groups IV, VII, VII and I.b of the periodic system are anodically dissolved in aprotic organic solvents in the presence of a supporting electrolyte and cathodically reduced in the presence of stabilizers to colloidal metal solutions or redispersible metal colloid powders with a particle size below 30 nm. The supporting electrolyte and the stabilizer may be identical. If the cathodic reduction is carried out in the presence of suitable supports, the metal colloids are precipitated onto those supports.

In addition, according to Chemical Abstracts Report 110:65662, fine-particle zirconium oxide powder can be obtained by electrochemically producing a base in a solution of zirconyl nitrate, the zirconyl nitrate being hydrolyzed by the base with precipitation of hydrated zirconium oxide. Crystalline zirconium oxide can be obtained from the hydrated zirconium oxide by calcination. According to Chemical Abstracts Report 20 114:31881, mixed oxides of iron, nickel and zinc can be produced by electrochemically precipitating a hydroxide mixture of those metals from metal salt solutions and calcining the isolated hydroxides to the mixed oxides.

The problem addressed by the present invention was to provide a new process for the production of amorphous and/or crystalline oxides of metals or mixed oxides of several metals which have mean particle diameters of about 1 to about 500 nm.

Accordingly, the present invention relates to a process for the production of amorphous and/or crystalline oxides of metals of the third to fifth main group or the secondary groups of the periodic system which have mean particle diameters in the range from 1 to 500 nm, characterized in that, using a cathode and an anode, ions of those metals dissolved in an organic electrolyte are electrochemically reduced at the cathode in the presence of an oxidizing agent.

Figure 2:
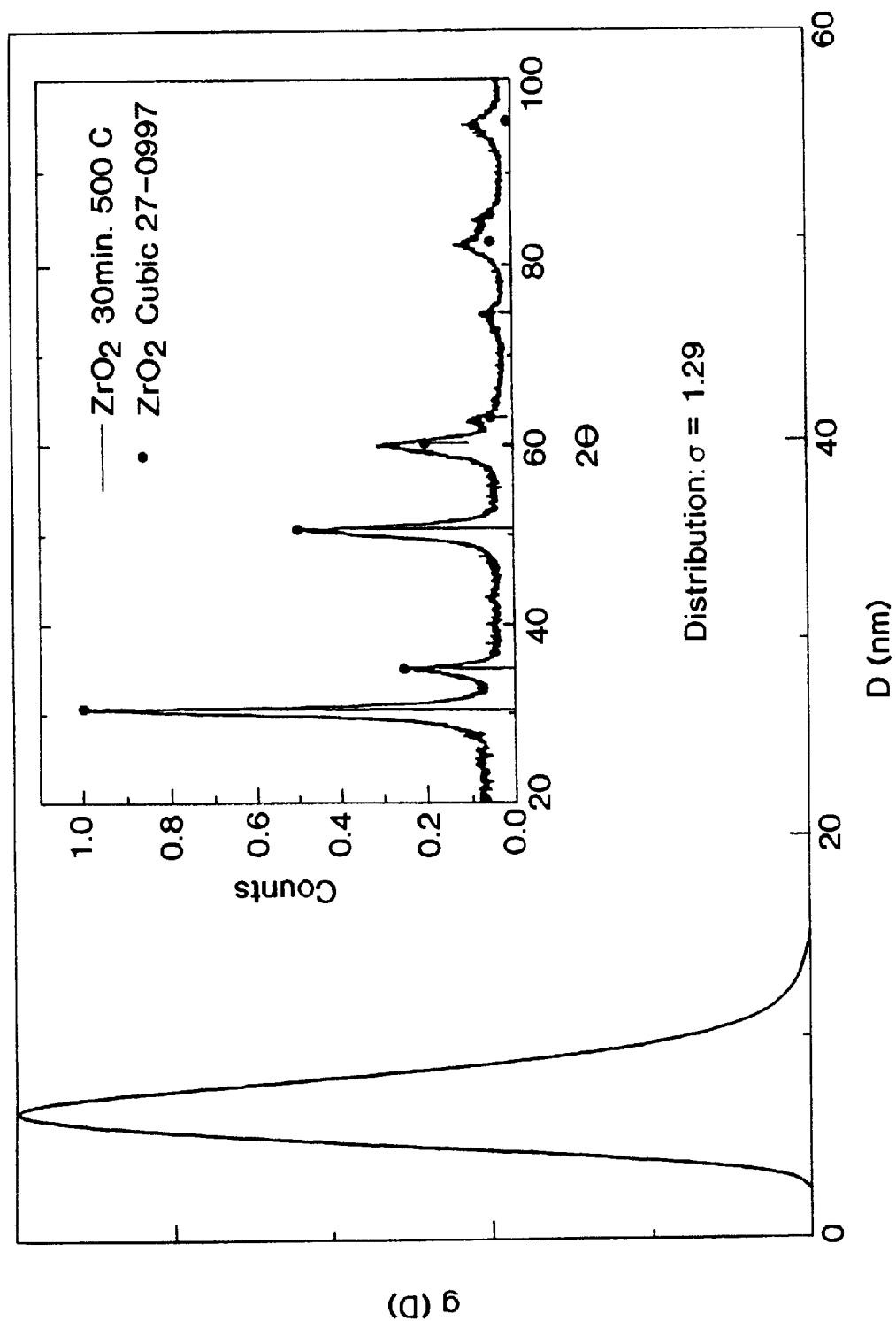
Figure 3:
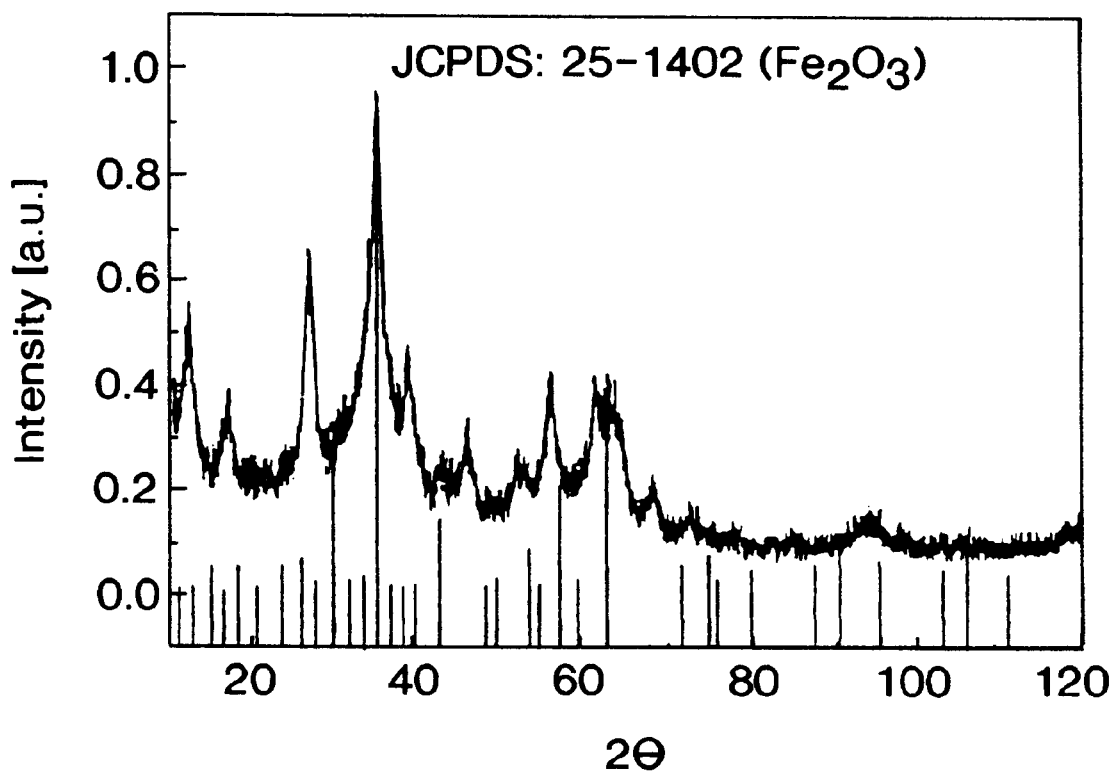

FIGS. 1 to 3 are X-ray diffractograms of certain metal oxide samples produced in the working examples of the present invention.

In this process, the mean particle diameter can be adjusted by varying the temperature of the electrolyte or the electrical voltage or current intensity or through the nature of the supporting electrolyte optionally used. The process is preferably carried out in such a way that the metal oxides obtained have mean particle diameters in the range from 5 to about 100 nm.

Using this process, it is only possible to produce metal oxides which do not react with moisture to form hydroxides at a temperature below about 100° C. Accordingly, the process is not suitable for the production of oxides of alkali or alkaline earth metals. It is particularly suitable for the production of oxides of metals which are oxidized by atmospheric oxygen at temperatures below about 100° C. Where metals such as these are used, the process according to the invention may be carried out at temperatures below 100° C. using air as the oxidizing agent. This enables the process to be carried out in an uncomplicated manner. The process is particularly suitable for the production of amorphous and/or crystalline oxides of Ti, Zr, Cr, Mo, Fe, Co, Ni and Al.

The organic electrolyte used is preferably a substance which is liquid at temperatures in the range from about −78° C. to about +120° C. at normal pressure. In one particularly preferred embodiment, a substance which is liquid at temperatures in the range from about 0 to about 60° C. at normal pressure is used. The organic electrolyte is preferably selected from alcohols, ketones, ethers, nitrites and aromatic compounds, those which are liquid at temperatures in the ranges mentioned being preferred. Particularly suitable electrolytes are tetrahydrofuran, acetone, acetonitrile, toluene and mixtures thereof with alcohols.

Depending on the metal oxide to be produced, it can be favorable if the electrolyte contains small quantities of water. For example, the water content of the organic electrolyte may be in the range from about 0.01 to about 2% by weight and, more particularly, is in the range from about 0.05 to about 1% by weight, the percentages by weight being based on the total quantity of organic electrolyte and water.

Should the electrolyte not of itself have an adequate electrical conductivity or acquire an adequate electrical conductivity by dissolution in salts of the metals whose oxides are to be produced, it is advisable to dissolve a supporting electrolyte in the electrolyte. The usual supporting electrolytes which are normally used to give the electrolytes mentioned an electrical conductivity sufficient for electrochemical processes may be employed. Suitable supporting electrolytes are, for example, electrolyte-soluble hexafluorophosphates, sulfonates, acetyl acetonates, carboxylates and in particular quaternary phosphonium and/or ammonium salts with organic groups at the phosphorus or at the nitrogen. Preferred supporting electrolytes are quaternary ammonium compounds which bear aryl and/or alkyl groups at the nitrogen and which are preferably present as halides. A particularly suitable example is tetrabutyl ammonium bromide.

The process according to the invention is preferably carried out in a temperature range in which the supporting electrolyte is sufficiently soluble in the organic electrolyte. The process is preferably carried out in such a way that the organic electrolyte has a temperature in the range from about 30 to about 50° C. If tetrahydrofuran is used as the electrolyte and tetrabutyl ammonium bromide as the supporting electrolyte, the process is preferably carried out at temperatures above 35° C. for example in the range from 35° C. to 40° C.

The supporting electrolytes have the additional effect that they protect the oxide particles formed against agglomeration. A very narrow particle size distribution can be obtained in this way. As described in a following Example, zirconium dioxide with a volume-averaged crystallite size of 8 nm, for example, can be produced in this way, the particle size distribution—expressed as the logarithmic normal distribution—having a sigma value of 1.29. If no importance is attached to a narrow particle size distribution, there is no need to add the supporting electrolytes providing the electrolyte has an adequate electrical conductivity from the dissolved salts of the metal to be precipitated as oxide.

According to the invention, the metal oxides are formed by electrochemical reduction of the ions of the metals at a cathode in the presence of an oxidizing agent. The easiest oxidizing agent to use is oxygen or air. Accordingly, oxygen or air is preferably used. In a preferred embodiment, therefore, the process is carried out by introducing air into the electrolyte during the electrochemical reduction of the metal ions. If desired, oxygen-enriched air or substantially pure oxygen may also be introduced into the electrolyte. Other suitable but less preferred oxidizing agents are hydrogen peroxide, organic or inorganic peroxo compounds or oxo anions of the halogens chlorine, bromine or iodine where the halogen has an oxidation number of +1 to +5. However, if stronger oxidizing agents than atmospheric oxygen are used, it is important to ensure that there is no peroxide formation with the electrolyte.

The electrical d.c. voltage between cathode and anode is preferably adjusted so that, for an anode area and a cathode area of 800 mm$^2$, a current flow of the order of about 5 to about 100 mA and more particularly in the range from about 10 to about 50 mA occurs. Given a sufficiently conductive electrolyte, this can be achieved by applying a d.c. voltage of about 1 to about 100 volts between the cathode and anode.

In a preferred embodiment, the electrolyte is vigorously agitated throughout the process. Thus can be done, for example, by stirring the electrolyte. In addition or alternatively, the electrolyte may be ultrasonicated for this purpose. The advantage of electrolyte agitation and/or ultrasonication is that the metal oxides formed do not adhere to the cathode and cover it with an insulating layer.

The ions of the metal or metals whose oxides or mixed oxides are to be produced can enter the electrolyte in various ways. For example, it is possible to use an anode which contains the metal whose oxide is to be produced and which dissolves anodically during the production of the oxides. Accordingly, the anode may consist, for example, of the metal whose oxide is to be produced. Alternatively, an anode of an inert material coated with the metal whose oxide is to be produced may be used. In the latter case, the corresponding metal separates anodically from the anode during the electrochemical production of the metal oxide.

In cases where it is desired to produce an oxide of only one metal, an electrode consisting solely of, or coated with, that metal is used. However, mixed oxides of various metals can also be produced by the process according to the invention. In this case, either an anode consisting of, or coated with, these various metals may be used or, alternatively, several anodes each consisting of or coated with a different metal may be used. The alternative procedure has the advantage that different voltages may be applied between the cathode and the various anodes in order to take account of the different solution potentials of the various metals.

However, the process according to the invention may also be carried out by using an inert anode and dissolving in the electrolyte a salt of the metal or salts of the metals of which the oxide or mixed oxide is to be produced. In this case, the salts selected must of course be sufficiently soluble in the electrolyte used. Where tetrahydrofuran is used as the electrolyte, chlorides or nitrates of the particular metals, for example, are generally suitable.

A material which is inert under the electrolysis conditions selected is preferably used as the cathode material and optionally the anode material. Suitable electrode materials are, for example, electrodes of platinum or other platinum metals, gold, stainless steel, titanium or glassy carbon.

The oxides or the mixed oxides are obtained in X-ray amorphous or crystalline form, depending on the metal and the electrolysis conditions. Accordingly, they show either an X-ray diffractogram which resembles that of a liquid and has only a few broad maxima (X-ray amorphous, FIG. 1) or which consists of individual clearly contrasting X-ray reflexes (X-ray crystalline, FIG. 2, FIG. 3). The X-ray amorphous or X-ray crystalline metal oxides obtained are separated from the electrolyte either continuously or in batches, for example by continuous or discontinuous filtration or centrifugation. If necessary, the metal oxides separated from the electrolyte are washed, preferably with the organic solvent used as electrolyte, in order to remove any salt residues present. The metal oxides are then dried, for example at a temperature of 100° C.

If it is intended to produce crystalline metal oxides or mixed oxides and if they do not. accumulate in the. desired form during the electrolysis process, the metal oxides separated from the electrolyte may be thermally aftertreated. For example, they may be converted into an X-ray crystalline form by calcination at a temperature in the range from about 300 to about 1200° C. and more particularly at a temperature in the range from about 400 to about 1,000° C. The calcination time will depend on the rate at which the amorphous oxides are converted into the crystalline oxides and may be, for example,.between about 5 minutes and about 4 hours. Depending on the metal oxide selected, the size of the crystallites may increase with increasing calcination time.

Example

Examples 1 to 5

General Electrolysis Conditions 1 g tetrabutyl ammonium bromide (TBAB) was dissolved with gentle heating (40° C.) in 100 ml tetrahydrofuran (THF) with a water content of 0.5 to 1% by weight. A 20×40 mm metal plate (thickness 1 mm) was used as the anode and a 20×40 mm stainless steel or titanium plate (thickness 1 mm) as the cathode. For a current flow of 10 to 50 mA, the electrolysis was maintained for 12 to 18 hours. Throughout the electrolysis, air was passed through the electrolyte. In addition, the electrolyte was stirred. The electrolysis has to be carried out at 35 to 40° C. because TBAB precipitates below 35° C. The initially clear solution turned cloudy after only a few minutes. On completion of the electrolysis, the product was allowed to settle in the heat and was then filtered with a nutsch filter (black band filter). The product was dissolved from the filter and dried at 100° C. Phase purity, crystallite size and crystallite size distribution were investigated by X-ray wide-angle diffractometry (XRD).

Example 1

Production of $ZrO_2$

A 1 mm thick pure zirconium plate (99.99%) was used as the anode. The experiment was carried out as described in the preceding Example. A current flow of 40 mA was applied between the electrodes. Working up of the product gave 1.5 g of a white powder. X-ray investigation did not reveal any Bragg reflexes, but a liquid-like diffraction pattern instead (FIG. 1). The particle size was determined from a TEM micrograph which showed a mean particle size of 15 nm.

Example 2

Production of Amorphous $Fe_2O_2$

The procedure was carried out as in Example 1 using an iron anode (current flow 35 mA). After 12 hours, 1.2 g of an X-ray amorphous powder were isolated.

Example 3

Production of Amorphous $TiO_2$

The procedure was carried out as in Example 1 using a pure titanium anode (current flow 40 mA). After 12 hours, 1.7 g of an X-ray amorphous powder were isolated.

Example 4

Production of Amorphous $Al_2O_3$

The procedure was carried out as in Example 1 using a pure aluminium anode (current flow 45 mA). After 16 hours, 1.1 g of an X-ray amorphous powder were isolated.

Example 5

Production of Amorphous $MoO_3$

The procedure was carried out as in Example 1 using a pure molybdenum anode (current flow 40 mA). After 12 hours, 0.9 g of an X-ray amorphous powder were isolated.

Examples 6 and 7

Cathodic Precipitation of Metals from Metal Salt Solutions with in-situ Oxidation In this variant of the process, the anodic dissolution of a metal anode is avoided by using a metal salt solution. The salts may be used as chlorides or nitrates because there are soluble in THF. Inert electrodes of platinum (20×40 mm, 1 mm thick) are used as the electrodes. As in the first variant, the metal cations are reduced at the cathode in the presence of TBAB and oxidized in situ by dissolved oxygen. Throughout the electrolysis, air was passed through the electrolyte. In addition, the electrolyte was stirred.

Example 6

Production of amorphous $ZrO_2$ 2 g $ZrOCl_2$ were dissolved in 100 ml THF at 50° C. 1 g TBAB was then added. For a current density of 40 mA, the electrolysis was maintained for 18 hours. The product was then worked up in the same way as described in Examples 1 to 5. 1.5 g of X-ray amorphous crude product were obtained and can be crystallized to the required crystallite size by heat treatment.

Example 7

Production of Amorphous Iron Oxide

The process was carried out as in Example 6. 2 g $FeCl_2$ in 100 ml THF were used as the electrolyte. A current of 30 mA flowed for 16 hours. the result was 2 g of a X-ray amorphous crude product.

Examples 8 to 10

Crystallization Experiments on Amorphous Metal Oxides

The process described in Examples 1 to 7 always gives X-ray amorphous products. To convert the amorphous crude products into nanocrystalline oxides and to remove the supporting electrolyte (TBAB), the samples are heat-treated. The object of this is to control the crystallite size through the calcination conditions. Sizes of 5 to 100 nm are required. The samples are calcined in a tube furnace at a temperature of 400 to 1,000° C. The heat treatment lasts 15 to 200 minutes, depending on the temperature and nature of the sample. The combustion gases formed are removed by an air stream.

Example 8

Crystallization of $ZrO_2$ 0.3 g of crude product was treated for 30 minutes at 500° C. The end product was examined by XRD. The calcination product consists of phase-pure cubic zirconium oxide with a volume-averaged crystallite size of 8 mm. This value can be confirmed by electron microscopy. The product has a narrow crystallite size distribution (FIG. 2). The σ-value was 1,29 (a σ-value of 1.00 would correspond to a monodisperse system).

Example 9

Crystallization of Iron Oxide

The crystallization of amorphous iron oxide proceeds at a sufficient rate even at a temperature of 600° C. The following crystallite sizes were obtained by calcination at 600° C.:

| Time (minutes) | Crystallite size [nm] |
|---|---|
| 15 | 10 |
| 30 | 45 |
| 120 | >80 |

Example 10

Crystallization of Aluminium Oxide

Very high temperatures are required for the crystallization of aluminium oxide. Below 900° C. no crystallization could be detected even after several hours. Crystallite formation (γ-$Al_2O_3$) and significant crystallite growth only occur at 1,000° C. Crystallites with a volume-averaged crystallite size of 10 nm were found after one hour at 1,000° C.

Example 11

Production of Nanocrystalline Metal Oxides without Thermal Aftertreatment 2 g $FeCl_2$ were dissolved in 100 ml THF at 40° C. after which 1 g tetraethyl ammonium bromide (TEAB) was added. The solution was electrolyzed for 8 hours at 40 mA. Throughout the electrolysis, air was passed through the electrolyte. In addition, the electrolyte was stirred. The crude product was worked up as described in Examples 1 to 5, leaving 1.8 g of red-brown iron oxide. This product shows Bragg reflexes even in its production state (FIG. 3) and is the $Fe_2O_3$ modification with a crystallite size of 7 nm.

Examples 12 to 19

Further experiments as set out in Table 1.
Test conditions and products
General conditions:
Anode: metal to be reacted; cathode: titanium
Electrolyte: 500 ml tetrahydrofuran with TBAB as supporting electrolyte (0.1 mol/l);
Electrolysis with air passed through the electrolyte, duration 24–48 hours, current flow ca. 50 mA;
Partial ultrasonication of the electrolyte.

In the case of crystalline products, the mean crystallite size D was determined from the line width of the X-ray diffraction using Scherrer's formula.

comprising a step of electrochemically reducing at a cathode ions of said metal dissolved in an organic electrolyte in the presence of an oxidizing agent, said electrolyte being agitated and/or ultrasonicated.

2. The process of claim 1 wherein the organic electrolyte comprises at least one ketone, alcohol, ether, nitrile or aromatic compound.

3. The process of claim 1 wherein the organic electrolyte comprises acetone, tetrahydorfuran, acetonitrile toluene or mixtures thereof.

4. The process of claim 3 wherein the organic electrolyte is further comprised of at least one alcohol.

5. The process of claim 1 wherein the organic electrolyte is comprised of 0.01 to 2% by weight of water, based on the total quantity of organic electrolyte and water.

6. The process of claim 1 wherein the organic electrolyte is comprised of a dissolved supporting electrolyte.

7. The process of claim 1 is wherein said organic electrolyte is maintained at a temperature of 30° C. to 50° C. during said step of electrochemically reducing.

8. The process of claim 1 wherein said oxide particles are amorphous.

9. The process of claim 1 wherein said oxide particles are crystalline.

10. The process of claim 1 wherein said oxidizing agent is oxygen, hydrogen peroxide, a peroxo compound, or an oxo anion anions of halogens chlorine, bromine or iodine where the halogen has an oxidation number of +1 to +5, or mixtures thereof.

11. The process of claim 1 wherein an anode is used in addition to said cathode and an electrical d.c. voltage of 1 to 100 volts is applied between said anode and cathode.

TABLE 1

| Example No. | Anode | Current density (mA/cm²) | Ultrasonication | Product before calcination | After calcination (time/mins., temp.) | D (nm) |
|---|---|---|---|---|---|---|
| 12 | Mg | 3 | No | X-ray amorphous | 30 mins., 500° C., MgO | 27 |
| 13 | Sn | 3 | No | X-ray amorphous | 30 mins., 500° C., $SnO_2$ | 5 |
| 14 | Co | 3 | No | Crystalline | 30 mins., 300° C., $Co_3O_4$ | 11 |
| 15 | Ni | 3 | No | X-ray amorphous | 30 mins., 300° C., NiO | 4 |
|  |  |  |  |  | 30 mins., 500° C., NiO | 17 |
| 16 | Cu | 3 | Yes | Crystalline, mixture of Cu (0), Cu (I), Cu (II) | 30 mins., 500° C., CuO |  |
| 17 | Zn | 6 | Yes | Crystalline ZnO | — | 15 |
| 18 | In | 3 | Yes | X-ray amorphous | 15 mins., 500° C., $In_2O_3$ | 19 |
| 19 | V | 3 | Yes | X-ray amorphous | 30 mins., 500° C., $V_2O_5$ |  |

DRAWINGS

FIG. 1.

X-ray diffractogram and crystallite size distribution of amorphous $ZrO_2$ crude product. No Bragg reflexes are present

FIG. 2.

X-ray diffractogram and crystallite size distribution of a calcined zirconium oxide sample.

FIG. 3.

X-ray diffractogram of an iron oxide sample in the production state. Without calcination, a nanocrystalline structure is obtained.

What is claimed is:

1. A process for producing particles of an oxide of a metal selected from the third to fifth main groups and the secondary groups of the periodic system, said particles having mean particle diameters of 1 to 500 nm, said process 12. The process of claim 1 wherein said organic electrolyte is agitated.

13. The process of claim 1 wherein said organic electrolyte is ultrasonicated.

14. The process of claim 1 wherein an anode is used in addition to said cathode, said anode comprising the metal of the oxide to be produced.

15. The process of claim 1 wherein a plurality of anodes are used in addition to said cathode, said anodes comprising different metals from the oxides to be produced.

16. The process of claim 1, wherein at least a portion of said ions are obtained by dissolving a salt of said metal in said organic electrolyte.

17. The process of claim 1 further comprising separating said particles from the organic electrolyte.

18. The process of claim 17 further comprising drying said particles which have been separated from the organic electrolyte.

19. The process of claim 17 wherein said particles are calcined at a temperature of 300° C. to 1200° C. after separation from the organic electrolyte.

20. The process of claim 1 wherein the mean particle diameter of said particles is from 5 to 100 nm.

21. The process of claim 1 wherein said metal is capable of being oxidized by atmospheric oxygen at a temperature below 100° C.

22. The process of claim 1 wherein said metal is Ti, Zr, Cr, Mo, Fe, Co, Ni, Al or mixtures thereof.

23. The process of claim 1 wherein the organic electrolyte is further comprised of at least one supporting electrolyte of hexafluorophosphate, sulfonate, acetyl acetonate, carboxylate, quaternary phosphonium salt, quaternary ammonium salt or mixtures thereof.

24. A process for producing particles of an oxide of Ti, Zr, Cr, Mo, Fe, Co, Ni, Al, or mixtures thereof, said particles having mean particle diameters of from 1 to 500 nm, said process comprising electrochemically reducing at a cathode, ions of said metal dissolved in an organic electrolyte in the presence of a supporting electrolyte and oxygen; said organic electrolyte being comprised of at least one of ketone, alcohol, ether, nitrile, or an aromatic compound and from 0.01 to 2% by weight of water, based on the total quantity of organic electrolyte and water, and said organic electrolyte being agitated or ultrasonicated.

25. The process of claim 24 wherein said oxygen is supplied by air.

26. The process of clam 24 wherein the organic electrolyte comprises acetone, tetrahyrofuran, acetonitrile, toluene, or mixtures thereof.

27. The process of claim 26 wherein the organic electrolyte is further comprised of at least one alcohol.

28. The process of claim 24 wherein said organic electrolyte is maintained at a temperature of 30° C. to 50° C. during said step of electrochemically reducing.

29. The process of claim 24 wherein an anode is used in addition to said cathode and an electrical d.c. voltage of 1 to 100 volts is applied between said anode and said cathode.

30. The process of claim 24 wherein an anode is used in addition to said cathode, said anode comprising the metal of the oxide to be produced.

31. The process of claim 24 wherein at least a portion of said ions are obtained by dissolving a salt of said metal in said organic electrolyte.

32. The process of claim 24 further comprising separating said particles from the organic electrolyte.

33. The process of claim 32 further comprising drying said particles which have been separated from the organic electrolyte.

34. The process of claim 32 wherein said particles are calcined at a temperature of 300° C. to 1200° C. after separation from the organic electrolyte.

35. The process of claim 24 wherein the supporting electrolyte is a quaternary ammonium salt.

* * * * *

UNITED STATES PATENT AND TRADEMARK OFFICE
CERTIFICATE OF CORRECTION

PATENT NO. : 6,676,821 B1
DATED : January 13, 2004
INVENTOR(S) : Hempelmann et al.

It is certified that error appears in the above-identified patent and that said Letters Patent is hereby corrected as shown below:

Title page,
Item [73], Assignee, delete "Henkel Kommenditgesellschaft Auf", insert
-- Henkel Kommanditgesellschaft auf Aktien --.

Column 8,
Line 26, delete "anions".

Signed and Sealed this

Twentieth Day of December, 2005

JON W. DUDAS
*Director of the United States Patent and Trademark Office*